(12) United States Patent
Whittington et al.

(10) Patent No.: US 11,415,496 B2
(45) Date of Patent: Aug. 16, 2022

(54) SYSTEM TO CONTROL AN ACTUATOR

(71) Applicants: Wilburn Whittington, Starkville, MS (US); Haitham El Kadiri, Starkville, MS (US); Cory Krivanec, Starkville, MS (US)

(72) Inventors: Wilburn Whittington, Starkville, MS (US); Haitham El Kadiri, Starkville, MS (US); Cory Krivanec, Starkville, MS (US)

( * ) Notice: Subject to any disclaimer, the term of this patent is extended or adjusted under 35 U.S.C. 154(b) by 0 days.

(21) Appl. No.: 16/972,943

(22) PCT Filed: Feb. 8, 2019

(86) PCT No.: PCT/US2019/017342
§ 371 (c)(1),
(2) Date: Dec. 7, 2020

(87) PCT Pub. No.: WO2019/157375
PCT Pub. Date: Aug. 15, 2019

(65) Prior Publication Data
US 2021/0247280 A1   Aug. 12, 2021

Related U.S. Application Data

(60) Provisional application No. 62/628,039, filed on Feb. 8, 2018.

(51) Int. Cl.
*G01N 3/10* (2006.01)
*G01N 3/06* (2006.01)
*G01N 3/08* (2006.01)

(52) U.S. Cl.
CPC ............... *G01N 3/10* (2013.01); *G01N 3/062* (2013.01); *G01N 3/064* (2013.01); *G01N 3/066* (2013.01); *G01N 3/068* (2013.01); *G01N 3/08* (2013.01)

(58) Field of Classification Search
CPC .................................. G01N 3/08; G01N 3/10
See application file for complete search history.

(56) References Cited

U.S. PATENT DOCUMENTS

2019/0178764 A1\* 6/2019 Pelssers ............... A61B 5/0053

\* cited by examiner

*Primary Examiner* — Erika J. Villaluna
(74) *Attorney, Agent, or Firm* — Conley Rose, P.C.

(57) ABSTRACT

The invention consists of a novel system and method for controlling an actuator, such as a linear actuator, used to control motion of an object, such as a tensile specimen or other component. The invention comprises applying a controllable smart material to an actuator, wherein the controllable smart material varies the resistance to the actuator motion; deforming or moving the object; sensing the objects current state; recording an associated data set comprising a plurality of parameters related to the objects state; comparing the current state of the object to the target state of the object; and altering the resistance to the actuator by deforming the smart material until the target state is reached.

20 Claims, 7 Drawing Sheets

SYSTEM TO CONTROL AN ACTUATOR

CROSS-REFERENCE TO RELATED APPLICATION

This application claims priority from U.S. Provisional Patent Application Ser. No. 62/628,039 filed Feb. 8, 2018. The entirety of the provisional application is incorporated herein by reference.

FIELD OF THE INVENTION

This invention relates generally to the field of devices, systems, and methods used to control position(s) of actuators and more particularly to such devices, systems, and methods which require quick response or large accelerations.

BACKGROUND OF THE INVENTION

A critical need exists for increasing the response time of actuators. Machinery, automation equipment, and actuation equipment, which require the motion of objects, have a limitation in their minimum duty cycle times due to the response time of the actuator employed to achieve such duty cycle.

Hydraulic, pneumatic, electronic, and mechanical type actuators are primarily used to move objects during a given duty cycle. In closed-loop controlled actuator duty cycles, control systems are employed to provide relationships between the object's state and the motion of the actuator. The state to state response time of the object and the actuator motion are inherently linked through the control system of the actuator. For instance, in hydraulic and pneumatic systems, control of such actuators is typically performed using valves that modulate fluid flow to vary the actuator motion. In these actuators, the minimum duty cycle times are limited to the response times of these valves. In practice, valve opening and close times are rarely faster than 10 ms and only extremely small valves have response times less than 1 ms. Therefore, actuator ramp-up and ramp-down times are not less than 1 ms. This slow ramp-up and ramp-down time prevents actuators from performing certain operations that require duty cycles less than 1 ms as well as adds cost to complex or high-volume processes requiring faster duty cycles.

One industry requiring actuators with faster duty cycles is the materials testing industry. Standardized tensile testing is typically performed by servo-hydraulic systems that utilize hydraulic actuators with high speed valves. However, in demanding applications, such as in high speed tensile testing for automotive body panels, high speed servo-hydraulic machines cannot provide the duty cycles needed to attain such tensile testing speeds. Therefore, to reduce the ramp-up time in the duty cycle of these tensile tests, a mechanical "slack adapter" coupling is added to the system to prevent the actuator motion from contacting the tensile specimen until the actuator has reach the desired speed needed for the test. By adding a slack adapter, these systems no longer operate in a closed-loop control framework; this type of system has its own inherent problems such as: initial tensile specimen shock, no inherent control of tensile test during operation, and difficulty of stopping a tensile test intermittently.

Still another industry requiring actuators with faster duty cycles is the automated manufacturing and assembly industry. In these types of industries, a series of tasks is completed by machines to build products. The manufacturing times of these products negatively affects the manufacturing costs and the manufacturing lead-times. Many companies using automated manufacturing could benefit from reduced manufacturing costs and manufacturing lead-times to be more competitive or to add value to their sales margins.

While the following detailed description may also refer to linear-type actuators, the present invention applies to any type of actuation, such as rotation, where it is important to control the motion of an actuator. With specific references to linear actuators, one way of establishing this system is to provide a means of motion control used in linear-type actuators.

Since linear actuators are common in many industries, it provides a convenient platform on which to base such a new control system and method as described below.

Currently, valves and electronic switches dominate the technologies used to control typical actuator movement. The present invention addresses a major problem in actuator control in that no current methods exist that allow for ultra-high speed response of actuator technologies.

The invention addresses such deficiency and provides a novel actuator control system and method.

SUMMARY OF THE INVENTION

The present invention provides a novel system and method for controlling an actuator, such as a linear actuator for example, used to control the motion of a tensile specimen, comprising applying a controllable smart material to the actuator, wherein the controllable smart material is varying and can vary the resistance to the actuator by its own deformation. The invention further provides methods for communicating between an actuator and a controlling device in order to provide closed-loop control of such actuator.

With the foregoing and other objects, features, and advantages of the present invention that will become apparent hereinafter, the nature of the invention may be more clearly understood by reference to the following detailed description of the preferred embodiments of the invention, the figures, and the appended claims.

BRIEF DESCRIPTION OF THE DRAWINGS

The drawings shown in the Detailed Description of the Invention are intended to illustrate further the invention and its advantages. The drawings, which are incorporated in and form a portion of the specification, illustrate certain preferred embodiments of the invention and, together with the entire specification, are meant to explain preferred embodiments of the present invention to those skilled in the art. Relevant FIGURES are shown or described in the Detailed Description of the Invention, wherein like reference numerals denote like elements, as follows.

DETAILED DESCRIPTION OF THE INVENTION

The present invention is a system and method of controlling an actuator, or similar controllable movable device, used to control motion of a tensile specimen and generally is comprised of the following: (a) a load is applied to an actuator; (b) a smart material provides resistance to actuator motion; (c) a controller changes and/or controls the state of the smart material, resulting in deformation; (d) the actuator provides motion to a tensile specimen; (e) a sensor determines the state of the tensile specimen; and (f) sensor information is computed and/or analyzed by the same or another controller. At least one aspect of the novelty of the invention is in the addition and utilization of the controller that changes and/or controls the state of the smart material. Another novelty of the invention is that the actuator provides motion to the tensile specimen. Yet another feature is that the response time is drastically improved over typical actuator control. The invention utilizes a damping system that uses friction, which is unique, which allows precise movement control.

Figure 1:
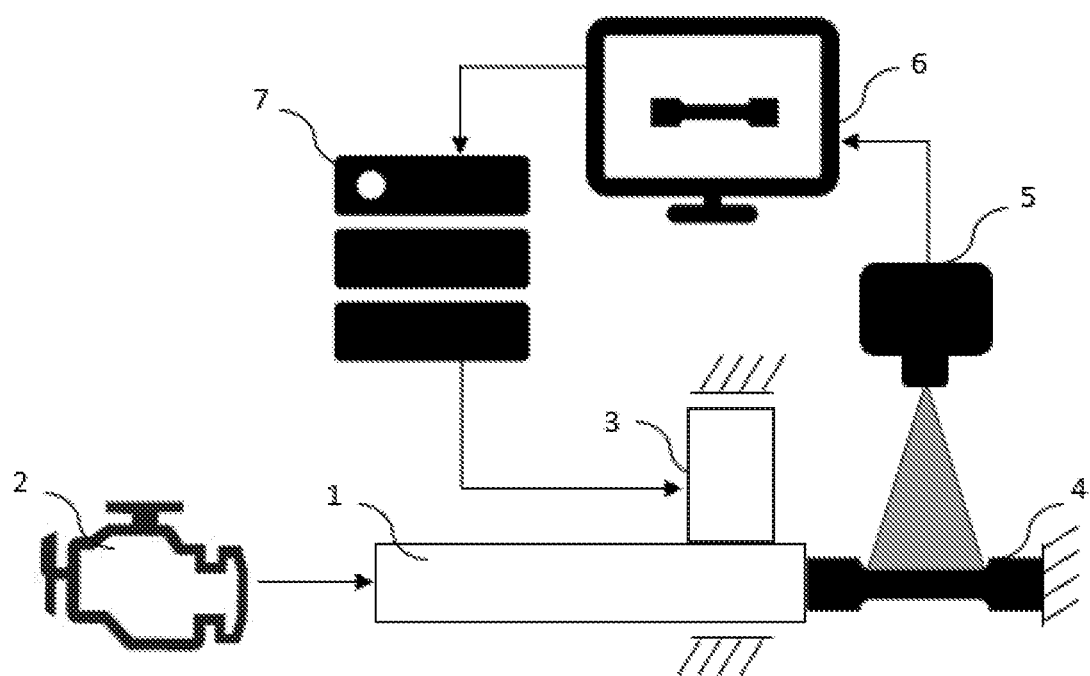
FIG. 1 illustrates a schematic view of a preferred embodiment of the present invention in the form of a method of controlling an actuator.

A schematic view of a preferred embodiment of the present invention in the form of a method of controlling an actuator is shown in FIG. 1, where a load is applied to an actuator such as a linear actuator 1 by a motor device 2, or similar means such as electrical, mechanical, pneumatic, gas, hydraulic, thermal, magnetic, optical, or electromagnetic means, or a combination thereof, for example, to produce movement of and in the linear actuator 1 that is resisted by a controllable smart material 3 on and connected to the linear actuator 1. The actuator can be linear or non-linear. One key novelty of the system and method of the present invention is the interaction between the linear actuator 1 and the controllable smart material 3. A tensile specimen 4 has a physical state that can be and/or is capable of being changed or modified by the actuator. A state, as used herein, is defined as a physical state. Once the linear actuator 1 changes the state of the tensile specimen 4, the state of the tensile specimen 4 can be detected and read and monitored by a sensor such as by a camera 5 or other similar reading/monitoring/recording device, for obtaining data including audio and/or video data, for example. At least one change of state occurs with the controllable smart material 3 and/or with the tensile specimen 4, thereby resulting in deformation. The controllable smart material 3 is linked to associated recorded data in a data recorder 6 for storing, monitoring, analyzing, and providing data and becomes part of and is connected to a controller 7, such as an electrical and/or computer-based controller, including a real-time controller, whose algorithm can be updated with recorded data from the data recorder 6 during the duty cycle applied to the tensile specimen 4.

The system and method of the invention provides for linear actuator 1 whereby the resistance to motion of the linear actuator 1 is controlled and varied by friction force created by and from the deformation applied to the controllable smart material 3. Moreover, the controller 7 provides communication and/or data concerning or about the motion of the linear actuator 1 to the controllable smart material 3 to achieve or obtain a target duty cycle or optimum target duty cycle. Duty cycle is defined herein as a ramp-up, a steady-state, and a ramp-down and target duty cycle is defined herein as specified values of displacement, velocity, and acceleration.

Figure 2:
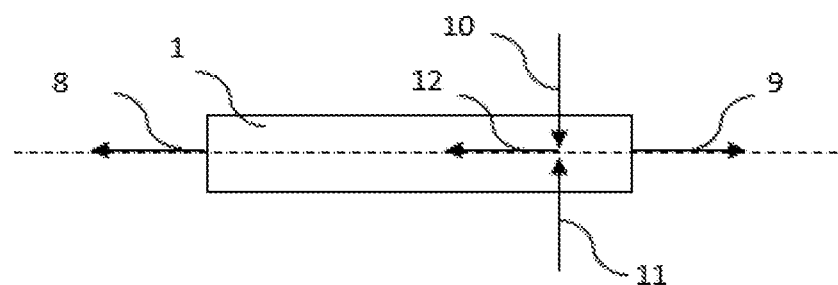
FIG. 2 is an illustration of the free-body diagram of a linear actuator being controlled by a preferred embodiment of the present invention.

An illustration of the free-body diagram of a linear actuator being controlled by a preferred embodiment of the present invention is shown in FIG. 2. This embodiment shows the physical forces allowing for control of the movement of linear actuator 1 thereby controlling the state of tensile specimen 4, which show the motor force 8, which is the force applied by the motor device 2, the tensile force 9, which is the force applied by the tensile specimen 4, the clamping force 10 and the reaction force 11, which is the force applied by the controllable smart material 3, and the resultant friction force 12, which is produced by friction created by the clamping force 10 and the reaction force 11. The creation of the resultant friction force 12 is a critical part of the novelty of the system and method of the present invention, since virtually all other current actuators do not provide such friction force and must therefore vary the magnitude of a force, analogous to the motor force 8 of the invention, in order to change actuator position, velocity, and/or acceleration. Resistance to the motion of the actuator 1 is controlled by friction force(s) created by and from the deformation applied to the controllable smart material 3. FIG. 2 also shows the force interactions that highlight another novelty of the invention—altering and controlling the resistance of the linear actuator 1 motion by controllable deformation of the controllable smart material 3. It is important to note that the amount or quantity of the deformation of the controllable smart material 3 does not equal, i.e., is not relative to, the amount of quantity of movement of the linear actuator 1, but rather is relative to the amount or quantity of resistance to motion of the linear actuator 1. These two quantities may or may not be equal so that the deformation of the controllable smart material 3 may or may not be equal to the resistance of or to the motion of the linear actuator 1. It should also be understood that a wide range of variations of force equilibrium may be employed to any particular actuator type, without departing from the applicability of the present invention.

Figure 3:
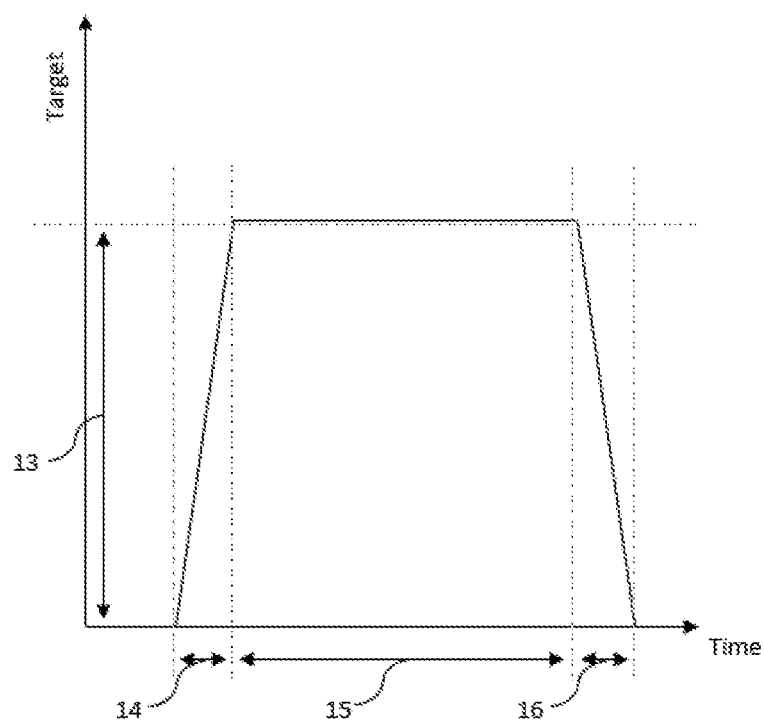
FIG. 3 is a view of a graph depicting the time elapsed during a duty cycle.

FIG. 3 is a view of a graph depicting the time elapsed during a duty cycle, which shows a target state 13 being achieved after a ramp-up time 14, a steady-state time 15 at the target state 13, and a ramp-down time 16 from the target state 13. Regarding the tensile specimen 4, ramp-up time is defined as the time required for the specimen to reach a target velocity, steady-state time is defined as the time required for the specimen to remain at the target velocity, ramp-down time is defined as the time required for the specimen to return to no movement, and target state is defined as the displacement required for the specimen to incur. One or more than one such target state(s) may exist. FIG. 3 shows the simplest example of a duty cycle of the invention and many more shapes can be created. Another novelty of the system and method of the present invention is that the ramp-up time 14 and the ramp-down time 16 can now have much higher slopes than ever before, thereby resulting in faster actuator response times. It should also be understood that a wide range of variations in such events may be applicable to any particular duty cycle, without departing from the applicability of the present invention.

The method of the invention generally consists of controlling an actuator used to control the motion of a tensile specimen. The method comprises applying a controllable smart material 3 to a linear actuator 1, such that the controllable smart material 3 varies the resistance to the motion of the linear actuator 1. Further, the method provides applying some external force to the linear actuator 1 and altering and/or controlling the resistance of the motion of the linear actuator 1 by controllable deformation of the controllable smart material 3, whereby the deformation of the controllable smart material 3 is relative to the resistance to the motion of the linear actuator 1, and not to the movement of the linear actuator 1. Therefore, the deformation of the controllable smart material 3 may or may not be equal to the resistance of or to the motion of the linear actuator 1. The method further provides for sensing of the change of state of the tensile specimen 4, i.e. deformation, and updating the data or dataset(s) of the change of state of the tensile specimen 4. Dataset is defined herein as analog and/or digital information concerning displacement, velocity, and/or acceleration. Finally, the method involves comparing a current state of the tensile specimen 4, in real-time, with a target state of the tensile specimen 4 and altering or changing the deformation of the controllable smart material 3 to optimally change the resistance of the motion of the linear actuator 1 until the state of the tensile specimen 4 reaches or achieves the target state of the tensile specimen 4. All control functions are accomplished via at least one computer or computer-based controller or device. The linear actuator 1 has a resistance to motion which is varied and controlled by friction force created by and from the deformation applied to the controllable smart material 3. Information and/or data concerning the motion of the linear actuator 1 is communicated via the at least one computer-based controller or device to the controllable smart material 3 to achieve or obtain an optimum target duty cycle.

It should be understood that any reference to "tensile specimen" could be any moveable component, but particularly deforming components such as mechanical test specimens, fabrication materials, assembly materials, and many other variants. Therefore, any reference to tensile specimens should be construed as meaning any of the foregoing alternatives. Moreover, there are numerous other deformable and non-deformable components for which an actuator may find application with similar high speed duty cycles and fast response times using such smart materials.

With respect to the controllable smart material 3, in one embodiment, the controllable smart material 3 is controlled by a controller 7, such as a power amplifier and computer, proportional integral derivative (PID) controller, or other electrical or computer-based device, or a combination thereof, as shown in FIG. 1. In this embodiment, the controllable smart material 3 is of the electrical type, such as in piezoelectric materials and electrostatic materials for example. In another embodiment, the controllable smart material 3 is comprised of a magnetic type smart material, such as a magnetostrictive material, with an associated magnetic controller. Many other smart material types, such as pyroelectric and shape memory materials, for example, may be used with their own types of controllers. The smart material may also consist of a combination thereof.

The sensing is preferably performed using a camera 5 connected to a data recorder 6, such as a computer or a computer-based and/or controlled device. Information and/or data from the camera 5 may be monitored and controlled by a computer-based device. For example, a tensile specimen 4 will deform and move during mechanical testing. As the camera 5 senses the deformation of the tensile specimen 4, data received from the tensile specimen 4 can be sent to the data recorder 6 for retrieval of the associated data set that corresponds to that particular smart material. In other embodiments, the camera 5 and sensing is performed by other sensor types such as a sensor, recorder, a linear variable differential transformer (LVDT), strain gauge, velocimeter, or other types of sensors, or a combination thereof.

The duty cycle in the preferred embodiment comprises a ramp-up time 14, a steady-state time 15, and a ramp-down time 16. For example, a tensile specimen 4 undergoes a ramp-up time 14 in order to reach a target state 13, such as a target state 13 of position or velocity, and remains at that target state 13 for a given amount of time, referred to as the steady-state time 15, and then ends the duty cycle during a ramp-down time 16. In another embodiment, several target states may be programmed into the duty cycle and therefore complex duty cycles may be envisioned as necessary. Still, many target states, such as position, velocity, acceleration, force, torque, stress, strain, strain rate, and many other target states may be envisioned as necessary.

EXAMPLES

Intermediate Strain Rate Experimental Methods

The intermediate strain rate regime ($5\ s^{-1}$ to $500\ s^{-1}$) has been tested for nearly half a century. Intermediate strain rate testing has become a hot topic for at least two reasons: (1) materials have a transitional dependence mechanism at these rates, and (2) events such as automotive collisions, sport collisions, and metal forming are associated at these rates.

During quasi-static strain rates, materials exhibit small changes in mechanical properties due to a change in strain rate. However, at high strain rates, materials exhibit either a decrease or increase in material properties. The intermediate strain rate regime for certain materials is crucial in determining the shape of flow stress versus strain rate for constitutive modeling and for strain rate-dependent strength ratings. As a result, emphasis has been placed on the design of systems that can test materials at the intermediate strain rate.

The most widely-used systems for conducting experiments at the intermediate strain rate are modified servo-hydraulic systems. Several manufacturers design and manufacture modified servo-hydraulic systems that achieve speeds of up to 18 m/s. However, these systems have two main limitations: robust load acquisition and strain rate uniformity. Therefore, many research laboratories have tried to create their own intermediate strain rate systems, which include drop weight towers, cam plastometer, wedge bar systems, flying wedge system, modified SHPB systems, and Long SHPB systems.

Although researchers and engineers have developed systems that can test within the intermediate strain rate regime, it is apparent that no system is robust enough to test materials in tension and compression or has the ability to test soft to hard materials. Furthermore, each system is unable to collect consistent data due to the system's open loop control, signal interference, and/or data filtering techniques. The present invention addresses and resolves these issues.

Intermediate Strain Rate System with Closed Loop Control

Figure 4:
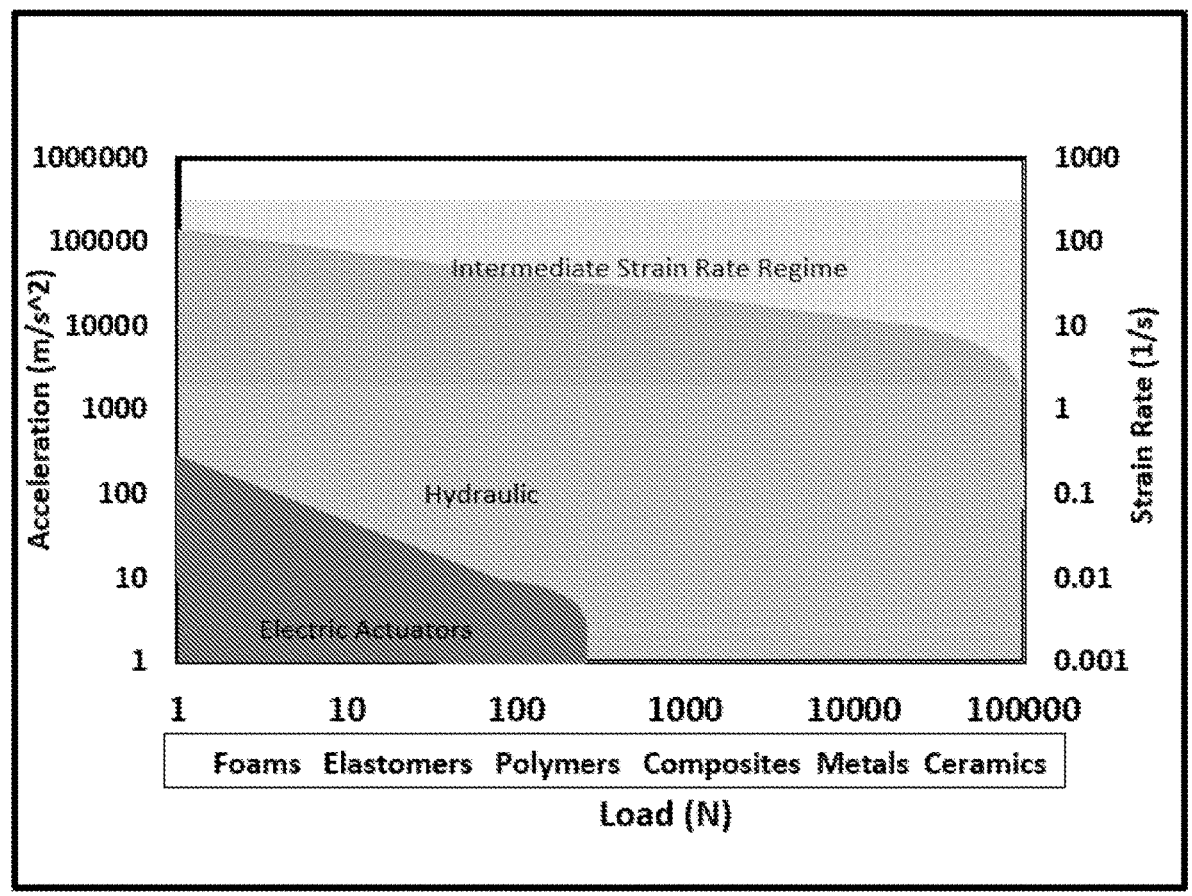
FIG. 4 is a graphical illustration of the difference in magnitude between available actuator technologies and the necessary behavior to control intermediate strain rate tests.

Depending on the material being tested and the strain rate target, intermediate strain rate tests require 1 ms to 10 ms to complete. To allow for the adjustment of system load and subsequent changes in the target speed, the load system must be able to respond in a much shorter amount of time (100 us to 1 ms). Unfortunately, servo hydraulic cylinders cannot achieve the desired regime of operation necessary for the closed loop operation of intermediate strain rate experiments. FIG. 4 shows the operation regions of current technologies, such as electronic and hydraulic actuators, and the required operating regions of intermediate strain rate experimentation on various materials.

FIG. 4 shows a difference of almost two orders of magnitude between available technologies and the necessary behavior to control intermediate strain rate tests up to 500 $s^{-1}$. Electronic actuators only reach controlled strain rates at intermediate rates for very low loads which limit their application to foams and elastomers. Hydraulic actuators can control experiments for lower intermediate strain rates of 10 $s^{-1}$ and below, and they can even control higher strain rates for soft materials. However, hydraulic actuators lack the ability to control high load materials at higher intermediate rates. Although some investigations into quick load control have used smart fluids such as magnetorheological and electrorheological fluids, these technologies do not have the fast, high load behavior needed to achieve the intermediate strain rate region.

An opportunity to increase the controllable strain rates of mechanical experiments can be found in semi-passive piezoelectric friction dampers that have been posed to solve seismic vibration issues in buildings and structures that require immediate response to the high forces. With this technology, it is possible to achieve high loads ($10^2$ kN) and "high-speed response" (rise times of less than 100 µs). However, challenges exist to adapt this technology to an actuator system, such as selection of an Actuator type (hydraulic, pneumatic, electronic, etc.), friction materials material optimization (high friction coefficients, stick-slip issues, stable wear rates, for example), and sensor/control development (LVDT, optical methods, processing time, etc.). The system and method of the present invention resolves the problems with an intermediate strain rate testing system based on the limitations in measuring load, achieving high speeds, and controlling strain rates in intermediate strain rate experiments, as well as opportunities to use new technologies, such as the serpentine bar and piezoelectric friction damper.

Piezoelectric Braking System

One of the main problems with current testing methods in the intermediate strain rate regime is the load system's ability to have the required response time to induce the proper load and velocities to produce strain rates in the intermediate strain rate regime. To combat this problem, the new actuator system of the invention utilizes a piezoelectric actuator, for example, that provides variable frictional forces to control the movement of the actuator's position. Ceramic piezoelectric actuators can produce loads up to 66 kN and displacements of 60 µm with a response time of 100 µs. These actuators can also be used in parallel to deliver even higher forces and are ideal for applications that require high loads with ultrafine accuracies and quick response times.

Figure 5:
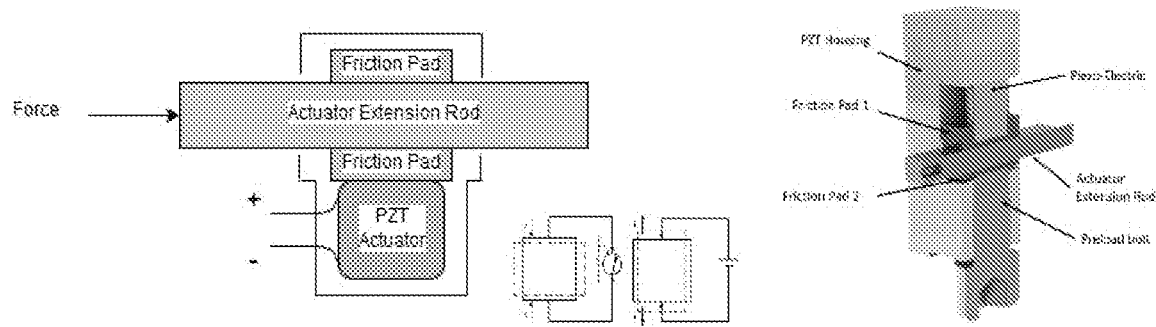
FIG. 5 is a schematic and model section view of a high-speed actuator based on semi-passive piezoelectric braking.

FIG. 5 displays a schematic view and model section view of a high-speed actuator based on semi-passive piezoelectric braking that is comprised of the following: a load frame responsible for housing and stabilizing the piezoelectric actuator and brake pads; an actuator extension rod used to extend the kinematic motion of the actuator piston and create a flat surface on which the brake pads can rest; and a piezoelectric actuator to provide normal load to the friction pad.

During the prototype phase of the high-speed actuator's braking system, it was determined that a flat extension rod would be needed instead of a round piston rod because the induced nonuniform pressure led to stick slip issues and control difficulty. Two sintered iron-copper brake pads with a frictional coefficient of µ=0.35 are used in Equation [1]. Sintered iron copper was chosen because of copper's ability to provide thermal dissipation, and the sintering aspect of the materials provision even wear. One of the brake pads was mated between the bottom face of the piezoelectric actuator and the top face of the actuator extension rod, while the other was mated between the bottom face of the actuator extension rod and the top face of the preload bolt. This bolt was used to apply a 15 MPa preload to the braking system, which is specified by Physik Instruments for any piezoelectric actuator being used in a dynamic environment and allows for all materials to be properly mated against one another. Furthermore, this preload ensures the piezoelectric actuator gives the maximum allowable normal force on the friction material (brake pads) since the amount of braking force is directly related to the amount of deflection that the piezoelectric actuator undergoes during operation.

The new high-speed actuator solely relies on the use of frictional forces to control the actuator rod. The system's response is directly related to the piezoelectric actuator's ability to control the amount of frictional force applied to the actuator's piston rod and the amount of pressure inside the actuator's cylinder. To determine the maximum and minimum pressure that the actuator extension rod can withstand before movement, the system was mated to a compact Parker hydraulic cylinder with a bore of 63 mm, rod diameter of 26 mm, and stroke of 53 mm. The actuator was pressurized to approximately 2.41 MPa before the actuator extension rod began to move. Then, the piezoelectric actuator was charged to its maximum capacity of 1000 V using a Physik Instruments E-482 PICA High-Performance Piezo Amplifier. The Parker actuator was then pressurized until the actuator extension rod began to move to approximately 8.96 MPa. Therefore, the system had a pressure range between 2.41 MPa and 8.96 MPa, yielding a maximum pressure difference of 5.86 MPa. By using the maximum pressure difference in equation [1], it was determined the piezoelectric actuator could apply a maximum holding force of 23 kN out of the 66 kN available. Using the stiffness of the piezoelectric actuator (1100 N/µm) also determined that 39 µm of deflection was lost.

$$H_F = \Delta P \times S_A \times 2 \times \mu \quad [1]$$

Figure 6:
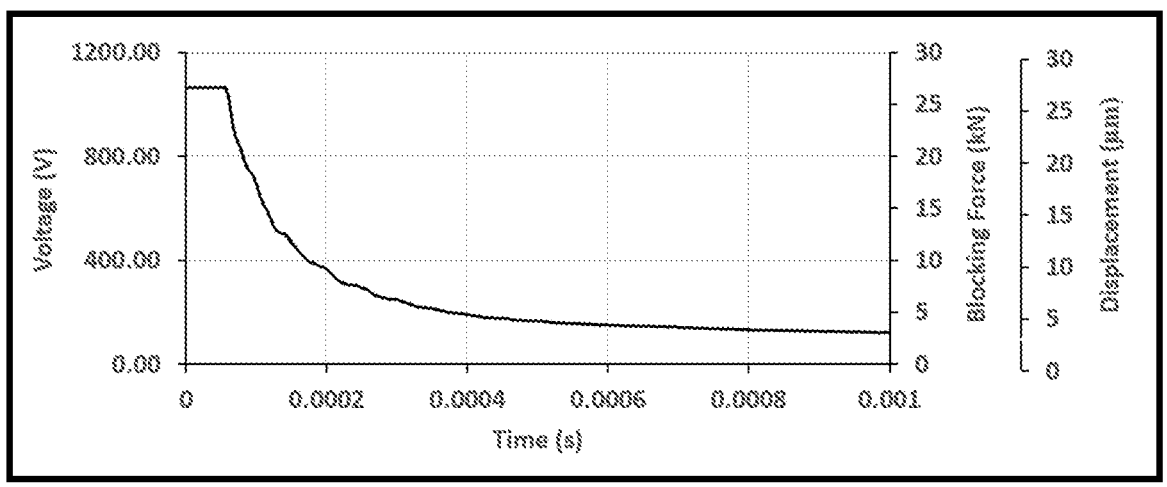
FIG. 6 is a graphical illustration of the voltage, displacement, and load response of the piezoelectric actuator and the results of the piezoelectric actuator's response to voltage drop for the system and method of the present invention.

The force exerted by the piezoelectric actuator can be seen in Equation [1], where $H_F$, $S_A$, and µ are the holding force, piezoelectric surface area, and the pad friction coefficient, respectively. The response time of the piezoelectric actuator was determined using the control monitor of the E-482 piezo amplifier, which gives a voltage signal from 10 V to 0 V. This range correlated with the operating range of the piezoelectric actuator (1000 V-0 V) by a factor of 100. In determining the response time, the amplifier charged the piezoelectric actuator to 1000 V. Once charged, the piezoelectric actuator was grounded using a high-voltage switch. The voltage drop resulted in a response time of 500 µs. Using Equation [2], which relates the relationship of applied voltage to the amount of force applied by the piezoelectric actuator, the response of the piezoelectric actuator's normal force was determined, where $\alpha_2$ is 0.023 kN/v. FIG. 6 shows the voltage, displacement, and load response of the piezoelectric actuator used in the work that resulted in the present invention and the results of the piezoelectric actuator's response to voltage drop.

$$\text{Force} = \text{Voltage} \times \alpha_2 \quad [2]$$

Figure 7:
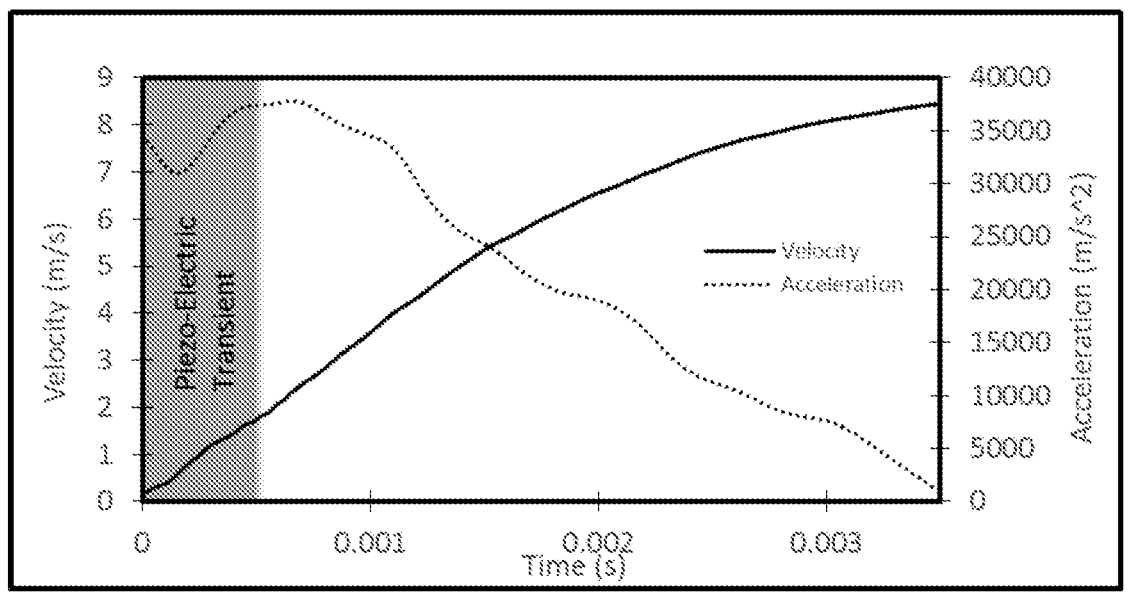
FIG. 7 is a graphical illustration of the response of the actuator rod and the average acceleration and the velocity of the actuator rod.

To characterize the movement of the actuator's extension rod, a Photron FASTCAM SA-Z series high-speed camera was set at 100,000 frames per second to capture the rod's movement at the maximum pressure difference of 5.86 MPa. Digital Image Correlation (DIC) software by Correlated Solutions was used to analyze the images, and the software calculated the acceleration and velocity of the actuator rod. The results of this work can be seen in FIG. 7, which shows the response of the actuator rod with an initial 5.86114 Pa pressure difference and an average acceleration of 25000 m/s$^2$ and a velocity of 4 m/s.

The results show the actuator control of the invention is an excellent solution for conducting tests, particularly at intermediate strain rates since the actuator displays the necessary response times to perform tests within the intermediate strain regime. Additionally, the system and method of the invention show results having accelerations and velocities that will produce long load duration.

All parameters presented herein including, but not limited to, sizes, dimensions, times, temperatures, pressures, amounts, distances, quantities, ratios, weights, volumes, percentages, and/or similar features and data and the like, for example, represent approximate values and can vary with the possible embodiments described and those not necessarily described but encompassed by the invention. Unless defined otherwise, all technical and scientific terms used herein have the same meaning as commonly understood to one of ordinary skill in the art to which this invention belongs. Further, references to 'a' or 'an' or 'the' concerning any particular item, component, material, or product is defined as at least one and could be more than one.

The above detailed description is presented to enable any person skilled in the art to make and use the invention. Specific details have been revealed to provide a comprehensive understanding of the present invention and are used for explanation of the information provided. These specific details, however, are not required to practice the invention, as is apparent to one skilled in the art. Descriptions of specific applications, analyses, materials, components, dimensions, and calculations are meant to serve only as representative examples. Various modifications to the preferred embodiments may be readily apparent to one skilled in the art, and the general principles defined herein may be applicable to other embodiments and applications while still remaining within the scope of the invention. Moreover, some features of the invention may be employed without a corresponding use of the other features. There is no intention for the present invention to be limited to the embodiments shown and the invention is to be accorded the widest possible scope consistent with the principles and features disclosed herein.

While various embodiments of the present invention have been described above, it should be understood that they have been presented by way of example and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. The preferred embodiments of the invention have been described herein, but it should be understood that the broadest scope of the invention includes such modifications as additional or different methods and materials. Many other advantages of the invention will be apparent to those skilled in the art from the above descriptions and the subsequent claims. Thus, the present invention should not be limited by any of the above-described exemplary embodiments.

The compositions, devices, products, processes, configurations, systems, and methods of the present invention are often best practiced by empirically determining the appropriate values of the operating parameters or by conducting simulations to arrive at best design for a given application. Accordingly, all suitable modifications, combinations, and equivalents should be considered as falling within the spirit and scope of the invention.

What is claimed is:

1. A system for controlling an actuator used to control the motion of a tensile specimen, the system comprising:
   an actuator configured to change a state of a tensile specimen;
   a motor device configured to apply a load to the actuator and to produce movement in the actuator;
   a controllable smart material on and connected to the actuator, the controllable smart material configured to apply controllable resistance to the actuator;
   a camera configured to sense the state of the tensile specimen;
   at least one real-time controller configured to alter deformation of the controllable smart material, wherein alteration of the deformation of the controllable smart material results in alteration of the controllable resistance applied to the actuator; and
   a data recorder connected to the camera and the at least one real-time controller, the data recorder configured to store data corresponding to the deformation of the controllable smart material.

2. The system of claim 1, wherein the actuator is linear or non-linear.

3. The system of claim 1, wherein the motor device creates movement in the actuator by electrical, mechanical, pneumatic, gas, hydraulic, thermal, magnetic, optical, or electromagnetic means, or a combination thereof.

4. The system of claim 1, wherein the controllable smart material is controllable by the at least one real-time controller and is of an electrical, electro-mechanical, magnetic, electromagnetic, or shape memory type, or a combination thereof.

5. The system of claim 1, wherein the at least one real-time controller is an electrical device, proportional integral derivative (PID) controller, or a combination thereof.

6. The system of claim 1, wherein the at least one real-time controller is a computer-based device.

7. The system of claim 6, wherein the at least one real-time controller updates data of the change of the state of the tensile specimen and compares the state of the tensile specimen with a target state of the tensile specimen.

8. The system of claim 6, wherein the at least one real-time controller alters the deformation of the controllable smart material to change the controllable resistance to the actuator until the state of the tensile specimen reaches a target state of the tensile specimen.

9. The system of claim 8, wherein the deformation of the controllable smart material is relative to the controllable resistance to the actuator.

10. The system of claim 6, wherein the at least one real-time controller provides data concerning the motion of the actuator to the controllable smart material to achieve a target duty cycle.

11. The system of claim 1, wherein the camera is a sensor, recorder, or a combination thereof.

12. The system of claim 1, wherein the camera is a linear variable differential transformer (LVDT), strain gauge, velocimeter, or a combination thereof.

13. The system of claim 1, wherein the camera determines the state of the tensile specimen and a deformation of the tensile specimen, and wherein information from the camera is monitored and controlled by a computer-based device.

14. The system of claim 1, wherein the data recorder is a computer or a computer-based device.

15. The system of claim 1, wherein the real-time controller is further configured to:
a ramp-up time, a steady-state time, and a ramp-down time of the tensile specimen; and
one or more target states of the tensile specimen.

16. The system of claim 15, wherein the target states are position, velocity, acceleration, force, torque, stress, strain, and strain rate.

17. The system of claim 1, wherein the controllable resistance to the actuator is controlled by friction force created by and from the deformation of the controllable smart material.

18. A method for controlling an actuator used to control motion of a tensile specimen, the method comprising:

applying a controllable smart material to an actuator, wherein the controllable smart material applies controllable resistance to the motion of the actuator;
applying an external force to the actuator;
controlling the actuator by altering the controllable resistance applied to the motion of the actuator via controllable deformation of the controllable smart material;
sensing a change of state of the tensile specimen;
updating a dataset of the change of state of the tensile specimen;
comparing a current state of the tensile specimen with a target state of the tensile specimen; and
altering the deformation of the controllable smart material to change the resistance to the motion of the actuator until the current state of the tensile specimen reaches the target state of the tensile specimen.

19. The method of claim 18, wherein the deformation of the controllable smart material is relative to the resistance to the motion of the actuator.

20. The method of claim 18, wherein the method is performed by at least one computer-based device.

* * * * *